United States Patent Office 3,376,292
Patented Apr. 2, 1968

3,376,292
16α,17α-DIHALOMETHYLENE[3,2-C]PYRAZOLE DERIVATIVES OF THE PREGNANE SERIES
Colin C. Beard, Boulder, Colo., and Alexander D. Cross, Mexico City, Mexico, assignors to Syntex Corporation, Panama, Panama, a corporation of Panama
No Drawing. Continuation-in-part of application Ser. No. 486,226, Sept. 9, 1965. This application Sept. 23, 1966, Ser. No. 581,457
13 Claims. (Cl. 260—239.5)

ABSTRACT OF THE DISCLOSURE 16,17α-difluoro- or -dichloro-methylenepregn-4-eno [3,2-C] pyrazoles optionally substituted at C-6 with methyl, fluoro or chloro; at C-9 with α-fluoro or α-chloro; at C-11 with β-hydroxy, β-chloro, or keto; at C-16 with β-methyl; at C-21 with hydroxy, fluoro, the C-21 esters, and tetrahydrofuranyl and tetrahydropyranyl ethers thereof; and at the 2'- position with methyl, phenyl or p-halophenyl. These compounds are anti-inflammatories.

---

This is a continuation-in-part of application Ser. No. 486,226, filed Sept. 9, 1965 now U.S. Patent No. 3,338,928.

This invention relates to cyclopentanophenanthrene derivatives. In particular, this invention pertains to 16α,17α-difluoromethylene steroids.

The compounds of this invention may be represented by the formula:

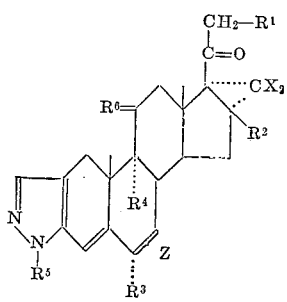

wherein:

X is fluoro or chloro;
$R^1$ is hydrogen, hydroxy, fluoro, hydrocarbon carboxylic acyloxy, tetrahydrofuran-2-yloxy, and tetrahydropyran-2-yloxy;
$R^2$ is hydrogen or methyl;
$R^3$ is hydrogen, methyl, fluoro, or chloro;
$R^4$ is hydrogen, fluoro, or chloro;
$R^5$ is hydrogen, methyl, phenyl, p-fluorophenyl, or p-chlorophenyl;
$R^6$ is oxygen or the group

where $R^7$ is hydrogen, hydroxy or chloro, $R^4$ being chloro when $R^7$ is chloro;
Z is a carbon-carbon single bond or a carbon-carbon double bond.

The hydrocarbon carboxylic acyloxy groups of the steroids of the present invention contain less than 12 carbon atoms and are straight, branched, cyclic or cyclic-aliphatic chain structures. The structures may be saturated, unsaturated, or aromatic and optionally substituted by functional groups such as hydroxy, alkoxy containing up to 5 carbon atoms, acyloxy containing up to 12 carbon atoms, nitro, amino, halogeno, and the like. Typical esters thus include acetate, propionate, enanthate, caproate, benzoate, trimethylacetate, t-butylacetate, phenoxyacetate, cyclopentylpropionate, aminoacetate, β-chloropropionate, adamantoate, and the like.

The compounds of the present invention possess anti-inflammatory properties and are useful in the treatment of skin diseases, musculoskeletal diseases, and the like. The steroids can be administered by the known pharmacological routes such as topically, orally, subcutaneously, and parenterally. The compounds may be administered in conventional forms such as pills, powders, capsules, solutions, suspension, syrups, and the like. The oral dosage will vary depending upon many factors, such as the condition being treated, the physical condition of the subject, and the like. As a general rule, an oral dosage in the range of about 0.001 mg. to about 10 mg. per kilogram of body weight is employed. Topically, the compounds can be applied as powders, creams, ointments, solutions, aerosols, containing about 0.001% to about 1% of the steroid. Optionally, the steroid may be administered with other therapeutic agents. The compounds of the present invention are prepared by treating a 20-keto-$\Delta^{16}$-steroid, with at least a molar equivalent, and preferably an amount greater than a molar equivalent, of an alkali metal salt or alkaline metal salt of an acid of the formula: W—CX$_2$COOH where W is chloro, bromo or iodo, and X is fluoro or chloro. Suitable reagents include sodium trichloroacetate, potassium bromodichloroacetate, sodium chlorodifluoroacetate, calcium iododichloroacetate, and the like. The reaction is conducted at temperatures, sufficient at least, to decompose the reagent, which is evidenced by the evolution of $CO_2$. For example, in the case of sodium trichloroacetate, reaction temperatures ranging from about 80° C. to about 150° C. and for sodium chlorodifluoroacetate, temperatures ranging from about 150° C. to about 180° C., preferably about 160° C., are employed.

The reaction is conducted in a nonaqueous, inert organic solvent of sufficient polarity to dissolve the reagent. Typical solvents include dimethyl diethyleneglycol ether, dimethyl triethyleneglycol ether, tetrahydrofuran, dimethylformamide, dimethylsulfoxide, and the like; mixtures of such solvents can also be employed. The reaction time will vary depending upon several factors, such as the temperature, the reagent used, the solvent used, and so forth. As a general rule, the reaction will be completed within a period ranging from about 1 hour to about 6 hours. The reaction can be followed to completion by ultraviolet spectroscopy. The product can be isolated by conventional techniques, such as chromatography.

During the reaction, free hydroxy groups present in the starting material will be esterified. These ester groups may be readily hydrolyzed at the completion of the reaction, such as with ethanolic potassium hydroxide. Alternatively, the hydroxy groups can be protected prior to the above process by esterification to a hydrocarbon carboxylic acyloxy group or etherified to a tetrahydropyran-2-yloxy or tetrahydrofuran-2-yloxy group.

After the principal process, the $\Delta^4$ unsaturation and/or $\Delta^6$ unsaturation may be introduced into the 16α,17α-dihalomethylene steroids. The $\Delta^4$ is introduced by brominating the 3-keto-steroid and dehalogenating the resulting 3-keto-4-bromo-steroid, with lithium chloride. The $\Delta^6$ is introduced by treating the 3-keto-$\Delta^4$-steroid with chloranil. The 5α,6β-dichloro steroids can be dehalogenated with zinc in the presence of acetic acid to yield the $\Delta^5$-steroid, which may be converted into the $\Delta^4$-steroid by treatment with aluminum isopropoxide in cyclohexanone.

The 6-fluoro, the 6-chloro, the 9-fluoro, the 9-chloro, the 11β-chloro, and the 21-fluoro groups can be introduced into the steroid following the introduction of the Δ⁴ unsaturation into the steroid. The 6-chloro group and the 6-fluoro group are introduced by treating the 3-ethoxy-Δ³,⁵-steroid respectively with N-chlorosuccinimide or perchloryl fluoride. The 3-ethoxy-Δ³,⁵-steroid is produced by treating the corresponding 3-keto-Δ⁴-steroid with ethylorthoformate. The 9α-chloro and 9α-fluoro are introduced by treating the 9β,11β-oxido steroid with hydrogen chloride or hydrogen fluoride respectively. The 9β,11β-oxido compounds are prepared by dehydroxylating the 11β-steroid to form the Δ⁹⁽¹¹⁾-steroid which in turn is treated with N-bromo acetamide in the presence of perchloric acid and then with potassium acetate to yield the desired 9β,11β-oxido steroid. The 9α,11β-dichloro steroid is formed by treating the Δ⁹⁽¹¹⁾-steroid with chlorine gas at about 0° C.

The 21-fluoro group is introduced by treating the 21-hydroxy steroid with mesyl chloride to yield the 21-mesylate derivative which is converted into the 21-iodo steroid upon treatment with sodium iodide, and the latter is converted into the desired product upon treatment with silver fluoride. Alternatively, the 21-acetoxy steroid may be produced by treating the 21-iodo-steroid with potassium acetate.

Prior to adding the pyrazole [3,2-C] moiety to the steroid it is preferable to protect free hydroxy groups either by esterification or etherification as described above, or optionally by oxidation to a keto group. The 11β-hydroxy group may be conveniently oxidized to the corresponding 11-keto group by conventional oxidation techniques such as with chromium trioxide in acetic acid. This group may be reduced, after the introduction of the pyrazole [3,2-C] moiety, by conventional techniques, as for example with sodium borohydride in anhydrous isopropanol.

After the hydroxy groups are properly protected, the 2-hydroxymethylene-3-keto-steroid is prepared by treating the corresponding 3-keto steroid with a molar excess of ethylformate and sodium hydride at room temperature for a period of time ranging from about 6 hours to about 24 hours or more. The product is then treated with hydrochloric acid to yield the desired 2-hydroxymethylene-3-keto-steroid.

The pyrazole [3,2-C] moiety is introduced by treating the 2-hydroxymethylene-3-keto-steroid with at least an equivalent amount of a hydrazine optionally in an inert atmosphere, such as in a N₂ atmosphere.

Various substituted hydrazines may be used in this procedure, but the hydrochloride or hydrates of hydrazine, ethyl hydrazine, phenyl hydrazine, p-fluorophenyl hydrazine, or p-chlorophenyl hydrazine are preferred. The reaction is carried out in an anhydrous, inert organic solvent such as absolute methanol or ethanol. The temperature is conducted at a temperature ranging from about 0° C. to about 80° C., preferably at about 15° C. The reaction time will vary, depending upon the temperature, particular solvent used, particular reagent used, and so forth. But as a general rule, the reaction will be completed within a period ranging from about 1 hour to about 24 hours.

When substituted hydrazines, such as phenyl hydrazine, are employed in the process, a mixture of varying amount of the 2′-substituted pyrazole[3,2-C]moiety and the 1′-substituted moiety are obtained; the two are separated by chromatography, fractional crystallization or similar known methods.

The product is isolated by any conventional techniques. For example, the solution may be reduced to dryness, extracted with methylene chloride, washed with a dilute acid solution, then with a dilute basic solution and finally with water to neutrality. The mixture is dried, reduced in vacuum to yield the desired product which may be recrystallized or chromatographed.

The novel compounds of this invention include, among others, the following:

16α,17α-difluoromethylene-11,20-dioxo-21-hydroxypregn-4-eno-[3,2-C]pyrazole;
11β-hydroxy-16α,17α-dichloromethylene-16β-methyl-20-oxo-21(tetrahydropyran-2-yloxy)-2′-methylpregna-4,6-dieno-[3,2-C]pyrazole;
9α,11β-dichloro-16α,17α-difluoromethylene-20-oxo-21-hydroxy-2′-phenylpregn-4-eno-[3,2-C]pyrazole;
9α-chloro-11β-hydroxy-16α,17α-difluoromethylene-16β-methyl-20-oxo-21-acetoxy-2′-(4-fluorophenyl)pregna-4,6-dieno-[3,2-C]pyrazole;
9α,21-difluoro-11β-hydroxy-16α,17α-difluoromethylene-20-oxo-2′-(4-fluorophenyl)pregna-4-eno-[3,2-C]pyrazole;
6,9α,21-trifluoro-11β-hydroxy-16α,17α-dichloromethylene-16β-methyl-20-oxo-2′-phenylpregna-4,6-dieno-[3,2-C]pyrazole;
6α-chloro-11β-hydroxy-16α,17α-difluoromethylene-16β-methyl-20-oxo-21-fluoro-2′-methylpregna-4-eno-[3,2-C]pyrazole;
6α-fluoro-16α,17α-dichloromethylene-11,20-dioxo-21-caproxypregna-4,6-dieno-[3,2]pyrazole;
11β,21-dihydroxy-16α,17α-difluoromethylene-20-oxo-2′-phenylpregn-4-eno-[3,2-C]pyrazole;
9α-fluoro-11β,21-dihydroxy-16α,17α-difluoromethylene-20-oxo-2′-(4-fluorophenyl)pregna-4,6-dieno-[3,2-C]pyrazole;
6α,11β-dimethyl-11β,21-dihydroxy-16α,17α-dichloromethylene-20-oxo-2′-methylpregn-4-eno-[3,2-C]pyrazole; and so forth.

If desired, at the completion of the above process, 11-keto groups may be reduced to the corresponding 11β-hydroxy groups by the procedure described above, and 21-esterified hydroxy groups may be hydrolyzed to the 21-hydroxy groups by conventional techniques, such as with ethanolic potassium hydroxide or potassium carbonate in methanol. The starting materials for the present invention are known or may be made by procedures described in Ser. No. 486,226, and in copending application Ser. No. 581,428, now abandoned and 581,453, both filed Sept. 23, 1966.

In order that those skilled in the art can more fully understand the present invention, the following examples are set forth. The examples are intended to merely illustrate the present invention and in no way should they be constructed as expressing limitations of the present invention.

Example I

To a stirred and refluxing solution of 1 g. of 3,20-bis-ethylenedioxy-6α-methyl-21-acetoxypregna-5,16-dien-11-one in 10 ml. of dimethyl triethylene glycol ether, is added in a dropwise fashion and under nitrogen gas atmosphere, a 50% weight by volume solution of sodium trichloroacetate. When the addition of 5 equivalents of reagent fails to produce an appreciable change in the U.V. spectrum, the addition is stopped. The solution is cooled to room temperature and filtered and the filtrate is evaporated to dryness under reduced pressure. The residue thus obtained is chromatographed on alumina, eluting with methylene chloride, to yield 3,20-bisethylenedioxy-6α-methyl - 16α,17α - dichloromethylene - 21 - acetoxypregn-5-en-11-one.

A solution of 1 g. of 3,20-bisethylenedioxy-6α-methyl-16α,17α-dichloromethylene-21-acetoxypregn-5-en-11 - one in 10 ml. of anhydrous tetrahydrofuran is cooled to 75° C. in a Dry Ice-acetone bath and treated with a previously cooled solution of 0.3 g. of lithium aluminum t-butoxide in 10 ml. of anhydrous tetrahydrofuran. After maintaining the reaction mixture at 75° C. for 1 hour and at room temperature for 30 minutes it is poured into ice water and extracted several times with ethyl acetate. These extracts are washed with water to neutrality, dried over anhydrous sodium sulfate and evaporated to dryness under vacuum. The residue is chromatographed and recrystallized from acetone:hexane to yield 3,20-bisethylenedioxy-6α-methyl-16α,17α-dichloromethylene - 21 - acetoxypregn-5-en-11β-ol.

A mixture of 1.0 g. of 3,20-bisethylenedioxy-6α-methyl-16α,17α-dichloromethylene-21-acetoxypregn-5α-methyl-16α,17α-dichloromethylene-21-acetoxypregn-5-en-11β - ol in 25 ml. of acetone and 0.1 ml. of concentrated hydrochloric acid is allowed to stand at room temperature for 15 hours, and then the reaction mixture is poured into 150 ml. of water. The resulting mixture is extracted with several portions of methylene chloride; the extracts are combined and are washed with an aqueous 5% potassium bicarbonate solution and then with water to neutrality, dried over sodium sulfate and evaporated to dryness under reduced pressure to yield 6α-methyl-16α,17α-dichloromethylene-11β-hydroxy-21 - acetoxypregn - 4 - ene-3,20-dione which is recrystallized from acetone:hexane.

One gram of 6α-methyl-11β-hydroxy-16α,17α-dichloromethylene-21-acetoxypregn-4-ene-3,20-dione is dissolved with slow heating in 12.5 ml. of dimethylformamide. The mixture is cooled, and a solution of 0.42 g. of methanesulfonyl chloride and 0.5 ml. of pyridine are added. After heating the reaction mixture at 80° C. for 30 minutes, it is cooled to room temperature, diluted with 125 ml. of water, and extracted with several portions of ethyl acetate. The extracts are combined, washed with several portions of an aqueous 5% potassium bicarbonate solution and then with water to neutrality, dried over sodium sulfate and evaporated to dryness under reduced pressure to yield 6α-methyl-16α,17α-dichloromethylene - 21 - acetoxypregna-4,9(11)-diene-3,20-dione.

The $\Delta^{4,9(11)}$-steroid is added to 2.5 ml. of chloroform, and to this solution a mixture of 0.2 g. of chlorine in 10 ml. of carbon tetrachloride is added over a 5-minute period with continuous stirring. After the reaction mixture has been allowed to stand at room temperature for 20 minutes, the reaction mixture is treated with 10 ml. of 5% aqueous sodium carbonate solution and then extracted with several portions of chloroform. The chloroform extracts are combined, and are washed with water to neutrality, dried over sodium sulfate and evaporated to dryness to yield 6-methyl-9α,11β-dichloro-16α,17α-dichloromethylene-21-acetoxypregn-4-ene-3,20-dione which may be recrystallized from acetone:hexane.

Alternatively the 9α-chloro-11β-hydroxy steroid may be prepared from the same $\Delta^{9(11)}$-steroid.

Twenty-eight grams of N-bromoacetamide are added over a one hour period with stirring, in the dark and at room temperature, to a mixture of 50 g. of 6α-methyl-16α,17α - dichloromethylene-21-acetoxypregna-4,9(11)-diene-3,20-dione, 500 ml. of pure dioxane and 8 ml. of 0.4 N perchloric acid. The reaction mixture is stirred for an additional hour and a solution of 10% sodium sulfite is then added until negative to potassium-starch indicator paper. Ice is added and the mixture extracted with chloroform. These extracts are washed consecutively with water, 5% aqueous sodium bicarbonate solution and water, and the solvent then removed by distillation in vacuo. The residue is triturated with acetone to yield the bromohydrin intermediate.

A mixture of 20 g. of anhydrous potassium acetate and 200 ml. of acetone is heated almost to boiling and a solution of 17 g. of the bromohydrin intermediate in 200 ml. of acetone is then slowly added with stirring. The mixture is refluxed for 10 hours, cooled and almost all of the acetone is removed by distillation. Iced water is then added and the solid which forms is collected by filtration, washed with water and dried to yield 6α-methyl-9β,11β-oxido-16α,17α-dichloromethylene - 21 - acetoxypregn-4-ene-3,20-dione which may be further purified through recrystallization from methylene chloride:benzene.

The solid is added to 500 ml. of anhydrous chloroform and cooled to 0° C. The mixture is stirred while 375 ml. of a 0.45 N chloroform solution of dry hydrogen chloride is added. The mixture is stirred for 1 hour at 0° C. and then diluted with water. The organic layer is separated, washed with aqueous sodium bicarbonate solution and with water, dried over sodium sulfate and evaporated under reduced pressure to yield 6α-methyl-9α-chloro-11β-hydroxy - 16α,17α - dichloromethylene-21-acetoxypregn-4-ene-3,20-dione which is recrystallized from acetone:hexane.

By a similar procedure, the 9-fluoro-11β-hydroxy steroid may be prepared from the same starting material.

To a stirred solution of 50 g. of 6α-methyl-9α,11β-oxido-16α,17α-dichloromethylene - 21 - acetoxypregn-4-ene-3,20-dione in 30 ml. of methylene chloride, cooled to 0° C., is added a cooled solution (−70° C.) of 58.6 g. of anhydrous hydrogen fluoride in 100 ml. of tetrahydrofuran over a period of 20 minutes. The mixture is stirred at a temperature below 10° C. for 6 hours and then neutralized by the cautious addition of 5% aqueous sodium bicarbonate solution. The organic layer is separated, washed with water, dried over sodium sulfate and concentrated until solid forms. The cooled mixture is then filtered and the solid dissolved in hot ethyl acetate. This solution is filtered hot and then cooled and the solid which forms is collected by filtration to yield 6α-methyl-9α-fluoro-11β-hydroxy-16α,17α - dichloromethylene-21-acetoxypregn-4-ene-3,20-dione.

Example II

To a stirred solution of 1 g. of 11β-hydroxy-16α,17α-dichloromethylene-16β-methyl-21-acetoxypregnane - 3,20-dione, 17 ml. of chloroform and 20 ml. of glacial acetic acid, cooled to −10° C., a few drops of a 15% solution of hydrogen bromide in acetic acid followed by a solution of 0.46 g. of bromine in 12 ml. of chloroform are added, the latter at such a rate that the reaction mixture maintains a pale yellow color. A cold solution of 2.5 g. of sodium acetate in 17 ml. of water is then added. The layers are separated and the aqueous layer is extracted with chloroform. The combined extracts and organic layer are washed with water, a dilute potassium bicarbonate solution and with water, dried over sodium sulfate and evaporated to dryness to yield the 4-bromo intermediate, 1 g. of which is dissolved in 20 ml. of dimethylformamide containing 0.5 g. of lithium chloride. This solution is stirred under nitrogen at steam bath temperatures for four hours. After cooling to 10° C., 11 ml. of water are added, with stirring, at such a rate that the temperature is maintained below 30° C. Stirring is continued in an ice bath until solid forms; the solid is then collected by filtration, washed with cold 1:1 water:dimethylformamide and then with water and dried to yield 11β-hydroxy-16α,17α-dichloromethylene-16β-methyl - 21-acetoxypregn-4-ene-3,20-dione which is further purified through recrystallization from acetone with decolorization by charcoal if necessary.

The above $\Delta^4$-steroid is placed in 7.5 ml. of anhydrous, peroxide-free dioxane and 1.2 ml. of freshly distilled ethyl orthoformate; then .8 g. of p-toluenesulfonic acid are added. The mixture is added at room temperature for 30 minutes. There is then added 0.8 ml. of pyridine, followed by water until solidification occurs. This solid is collected by filtration, washed with water and air dried to yield 3-ethoxy-11β-hydroxy-16α,17α-dichloromethylene-16β-methyl-21-acetoxypregna-3,5-dien-20-one which is recrystallized from acetone:hexane. The solid is placed in 25 ml. of dimethylformamide, cooled to 0° C. and a stream of perchloryl fluoride is passed through the solution for 5 minutes. After being allowed to slowly attain a temperature of 20° C., the solution is poured into water and extracted with ethyl acetate. These extracts are washed with saturated aqueous sodium bicarbonate solution and with water to neutrality, dried over sodium sulfate and evaporated to dryness. The residue is then chromatographed on alumina to separate the 6α-fluoro and 6β-fluoro-isomers. The latter, which predominates, is dissolved in 50 ml. of glacial acetic acid which is saturated with hydrogen chloride. The mixture is allowed to stand for a period of 24 hours at a temperature of 15° C. The mixture is poured into ice-water and the solid which forms is collected by filtration, washed with water to neutrality and dried to yield 6α-fluoro-11β-hydroxy-16α,17α - dichloromethylene-16β-methyl-21-acetoxypregn-4-ene-3,20-dione which is recrystallized from acetone:hexane.

Similarly the 6α-chloro-steroid may be prepared from the same starting material.

A mixture of 5 g. of 3-ethoxy-11β-hydroxy-16α,17α-dichloromethylene - 16β - methyl-21-acetoxypregna-3,5-dien-20-one, 2 g. of anhydrous sodium acetate and 100 ml. of acetone is treated with 32 ml. of water. The solution is cooled to 5° C. and 1.1 molar equivalents of N-chlorosuccinimide and 2 ml. of glacial acetic acid are added. The mixture is stirred at the same temperature and then diluted with water. After being allowed to stand at 0° C. for 15 hours, the solid is collected by filtration, washed with water and dried under vacuum to yield 6β-chloro-11β,21-dihydroxy-16α,17α-dichloromethylene-16β-methylpregn-4-ene,3,20-dione which is recrystallized from acetone. The corresponding 6α-chloro compound is obtained by dissolving this compound in glacial acetic acid and introducing a slow stream of anhydrous hydrogen chloride over a period of four hours and a temperature of 15° C. The solid which forms upon pouring this mixture into water is collected by filtration, washed with water and dried to yield 6α-chloro-11β-hydroxy-16α,17α-dichloromethylene-16β-methyl-21-acetoxypregn-4-ene-3,20 - dione which is recrystallized from acetone:hexane.

By the methods of the above procedure 6α - fluoro-11β,21 - dihydroxy - 16α,17α - dichloromethylenepregn-4 - ene - 3,20 - dione and 6α - chloro-11β,21-dihydroxy-16α,17α - dichloromethylenepregn - 4 - ene - 3,20-dione may be prepared.

Example III

One gram of 6α - methyl - 11β,21 - dihydroxy-16α,17α-dichloromethylenepregn - 4 - ene - 3,20 - dione and 2 g. of chloranil in 50 ml. of t-butanol are heated at reflux for 8 hours. The cooled reaction mixture is filtered and the solid thus separated is washed with a large volume of ethyl acetate. The combined filtrate and washings are in turn washed with cold 10% aqueous sodium hydroxide until the washings are colorless, dried over sodium sulfate and evaporated to dryness to yield 6α - methyl - 11β,21-dihydroxy - 16α,17α - dichloromethylenepregna - 4,6-diene - 3,20 - dione which may be further purified through clarification with alumina and recrystallization from methylene chloride:ether.

11β,21 - dihydroxy - 16α,17α - dichloromethylene-16β-methylpregna - 4,6 - diene 3,20 - dione; 6,9α-difluoro-11β,21 - dihydroxy - 16α,17α - dichloromethylenepregna-4,6 - diene - 3,20 - dione; 6 - methyl - 9α,11β-dichloro-16α,17α - dichloromethylene - 21 - hydroxypregna - 4,6-diene - 3,20 - dione; 16α,17α - dichloromethylene-16β-methyl - 21 - hydroxypregna - 4,6-diene - 3,11,20 - trione are similarly prepared from the corresponding 3 - keto-Δ⁴-steroids.

Example IV

To a stirred cooled solution of 4 g. of 6α - methyl-9α-fluoro-11β,21 - hydroxy - 16α,17α - dichloromethylenepregn - 4 - ene - 3,20 - dione in 30 ml. of tetrahydrofuran and 18 ml. of methanol is first added in small portions 6 g. of pure calcium oxide and then 6 g. of iodine. Stirring at room temperature is continued until the solution becomes a pale yellow. The mixture is then poured into ice-water containing 18 ml. of acetic acid and 2 g. of sodium thiosulfate. After stirring for 15 minutes, the solution is decanted and the solid collected by filtration to yield 6α - methyl - 9α - fluoro - 11β - hydroxy-16α,17α-dichloromethylene - 21 - iodopregn - 4 - ene - 3,20-dione. This compound is mixed with 80 ml. of acetone and 12 g. of recently fused potassium acetate. This mixture is refluxed for 8 hours and then concentrated to a small volume, diluted with water and extracted with ethyl acetate. The ethyl acetate extracts are washed with water, dried over sodium sulfate and concentrated until crystallization occurs. The solid is collected and recrystallized from methanol:water to yield 6α - methyl - 9α - fluoro-11β-hydroxy - 16α,17α - dichloromethylene - 21-acetoxypregn-4-ene-3,20-dione.

Example V

To a cooled solution (0° C.) of 3.4 g. of 6α,16β-dimethyl - 11β,21 - dihydroxy - 16α,17α-dichloromethylenepregn - 4 - ene - 3,20 - dione in 20 ml. of 9:1 chloroform:pyridine is added in small portions 1.4 g. of methanesulfonyl chloride. The reaction mixture is allowed to stand for 14 hours at 0° C. and is then washed with dilute hydrochloric acid, water and sodium bicarbonate solution. The chloroform is removed by evaporation under reduced pressure and the residue is dissolved in 20 ml. of acetone treated at room temperature and under stirring with 4 g. of sodium iodide. Sodium thiosulfate solution is added to decolorize the mixture, followed by the addition of water. The solid which forms is collected by filtration and dried in vacuum to yield 6α,16β - dimethyl - 11β - hydroxy - 16α,17α - dichloromethylene-21-iodo - pregn - 4 - ene - 3,20-dione. This material is dissolved in 20 ml. of acetonitrile and treated dropwise with 1.4 g. of silver fluoride in 3 ml. of water. The mixture is allowed to stand at room temperature for 24 hours and then filtered. The filtrate is concentrated under vacuum and the solid which forms is collected and dried to yield 6α,16β - dimethyl - 11β - hydroxy-16α,17α - dichloromethylene - 21 - fluoropregn - 4 - ene - 3,20-dione which is recrystallized from methanol:acetone.

Example VI

A mixture of 1 g. of 9α - fluoro - 11β,21 - dihydroxy-16α,17α - difluoromethylenepregna - 4,6 - diene - 3,20-dione, 4 ml. of pyridine, and 2 ml. of acetic anhydride is allowed to stand at room temperature for 15 hours. The mixture is then poured into ice water and the solid which forms is collected by filtration, washed with water and dried to yield 9α - fluoro - 11β - hydroxy - 16α,17α-difluoromethylene - 21 - acetoxypregna - 4,6 - diene - 3,20-dione which may be further purified through recrystallization from acetone:hexane.

Similarly, other 21-hydroxy steroids are esterified to 21- acetoxy steroids. For example, 9α,11β - dichloro-16α,17α - difluoromethylene - 16β - methyl-21-acetoxypregna-4,6 - diene - 3,20 - dione and 6 - fluoro-11β-hydroxy-16α,17α - dichloromethylene - 16β - methyl-21-acetoxypregn - 4,6 - diene - 3,20 - dione are prepared from the corresponding 21-hydroxy steroids.

By employing caproic anhydride in the above procedure, 9α - fluoro - 11β - hydroxy - 16α,17α - difluoromethylene - 21 - caproxypregna - 4,6 - diene-3,20-dione is produced.

Example VII

Two milliliters of dihydropyran are added to a solution of 1 g. of 9α - fluoro - 11β,21 - dihydroxy - 16α,17α-difluoromethylenepregn - 4 - ene - 3,20-dione in 15 ml. of benzene. About 1 ml. is removed by distillation to remove moisture and 0.4 g. of p-toluenesulfonyl chloride is added to the cooled solution. This mixture is allowed to stand at room temperature for four days, and is then washed with an aqueous sodium carbonate solution and water, dried and evaporated. The residue is chromatographed on neutral alumina, eluting with hexane, to yield 9α - fluoro - 11β - hydroxy - 16α,17α - difluoromethylene - 21 - (tetrahydropyran - 2 - yloxy)pregn-4-ene-3,20-dione which is recrystallized from pentane.

Similarly, 9α - fluoro - 11β - hydroxy-16α,17α-difluoromethylene - 21 - (tetrahydrofuran - 2 - yloxy)pregn-4-ene - 3,20 - dione is produced by replacing dihydropyran with dihydrofuran in the above procedure.

Example VIII

A solution of 6 g. of 11β - hydroxy - 16α,17α-difluoromethylene - 16β - methyl - 21 - acetoxypregn - 4 - ene-3,20-dione in 120 ml. of pyridine is added to a mixture of 6 g. of chromic trioxide in 20 ml. of pyridine. The reaction mixture is allowed to stand at room temperature for 15 hours, diluted with ethyl acetate and filtered through Celite diatomaceous earth. The filtrate is washed well with water, dried and evaporated to dryness to yield 16α,17α - difluoromethylene - 16β - methyl - 21 - acetoxypregn-4-ene-3,11,20-trione which may be further purified by recrystallization from acetone:hexane.

Other 11β-hydroxy steroids may similarly be oxidized to the corresponding 11-keto steroids. For example, 6-fluoromethylene - 16β - methyl - 21 - acetoxypregna-4,6 - diene - 3,11,20 -trione, 6,9α - difluoro-16α,17α-difluoromethylene - 16β - methyl - 21 - acetoxyprenga-4,6 - diene - 3,11,20 - trione, and 9α - fluoro-16α,17α-difluoromethylene - 21 - acetoxypregn - 4 - ene - 3,11,20-trione are prepared from the corresponding 11β-hydroxy steroids.

Example IX

A suspension of 3 ml. of ethyl formate and 1.3 g. of sodium hydride in mineral oil is added to a cooled solution of 3 g. of 9α-fluoro-16α,17α-difluoromethylene-21-(tetrahydropyran-2-yloxy)pregn-4-ene-3,11,20-trione in 60 ml. of anhydrous benzene. The reaction is conducted under a nitrogen atmosphere, and the reaction mixture is stirred for 24 hours. Hexane is added to the mixture until complete precipitation occurs, then the solid is collected by filtration, washed and dried under vacuum. The solid is added to aqueous hydrochloric acid and stirred for one half hour, filtered, washed to neutrality with water to yield 2 - hydroxymethylene - 9α - fluoro - 16α,17α - difluoromethylene - 21 - (tetrahydropyran - 2 - yloxy)pregn - 4-ene-3,11,20-trione which is recrystallized from methylene chloride:hexane.

The product (2.5 g.) is added to 60 ml. of ethanol together with 0.42 g. of sodium acetate. The mixture is saturated with nitrogen gas, and 0.82 g. of p-fluorophenyl hydrazine hydrochloride is added. The mixture is heated at reflux for one hour and then evaporated to dryness. The residue is dissolved in methylene chloride and washed with dilute acid, dilute base and water to neutrality. The solution is dried, evaporated to dryness and placed in 50 ml. of dry acetone containing 0.2 ml. of concentrated hydrochloric acid. The mixture is allowed to stand for 10 hours at 25° C.; then it is added to 100 ml. of water. The solid that forms is filtered off, washed and dried to yield 9α - fluoro - 11,20 - dioxo - 16α,17α - difluoromethylene-21 - hydroxy - 2' - (4 - fluorophenyl)pregn - 4 - eno-[3,2-C]pyrazole.

Similarly, other steroids with the 3,2-C pyrazole moiety substituted at the 2' position may be prepared. For example, by using 0.73 g. of phenylhydrazine hydrochloride or 0.42 g. of methyl hydrazine hydrochloride instead of p-fluorophenyl hydrazine in the above procedure, 9α-fluoro - 11,20 - dioxo - 16α,17α - difluoromethylene - 21 - hydroxy - 2' - phenylpregn - 4 - eno - [3,2-C]pyrazole or 9α-fluoro - 11,20 - dioxo - 16α,17α - difluoromethylene - 21-hydroxy - 2' - methylpregn - 4 - eno[3,2-C]pyrazole are respectively produced.

Similarly, 11,20 - dioxo - 16α,17α - difluoromethylene-21 - hydroxy - 2' - (4 - fluorophenyl)pregna - 4,6 - dieno-[3,2-C]pyrazole; and 11,20-dioxo-9α - chloro - 16α,17α-dichloromethylene - 16β - methyl - 21 - adamantoyloxy-2' - (4 - fluoro-phenyl)pregna - 4,6 - dieno - [3,2-C]pyrazole are produced from the corresponding 3-keto-steroids by the above procedure.

A solution of 1 g. of 2-hydroxymethylene-16α,17α-difluoromethylene - 16β - methyl - 21 - (tetrahydrofuran-2-yloxy)pregna-4,6-diene-3,11,20-trione in 40 ml. of absolute ethanol is added to 0.38 ml. of hydrazine hydrate. The mixture is quickly heated to reflux under nitrogen and refluxed for one hour; then the mixture is taken to dryness. The residue is treated with water, and the solid that forms is collected by filtration, washed with water and dried to yield 11,20-dioxo-16α,17α-difluoromethylene-16β-methyl - 21 - (tetrahydrofuran - 2 - yloxy)pregna - 4,6-dieno-[3,2-C]pyrazole.

The steroid is added to a solution of 25 ml. of benzene, 5 ml. of ethylene glycol and 25 mg. of p-toluenesulfonic acid. The mixture is refluxed for 18 hours. The cooled mixture is washed with dilute base and then with water to neutrality, dried, evaporated to dryness, and added to an ice-cooled solution of 1 g. of sodium borohydride, 3 ml. of water and 120 ml. of methanol. The mixture is allowed to stand for 16 hours at 25° C. Acetic acid is added to the mixture and then it is concentrated to small volume and washed with water, dried and evaporated to dryness. The 11β-hydroxy-20-ethylenedioxysteroid is dissolved in 50 ml. of acetone and treated with 0.1 ml. of concentrated hydrochloric acid. The reaction mixture is stirred for one hour at room temperature. The reaction mixture is added to 150 ml. of water, and the solid that forms is collected by filtration, washed with an aqueous 5% potassium bicarbonate solution and with water to neutrality, dried, and evaporated to dryness to yield 11β,21 - dihydroxy - 16α,17α - difluoromethylene-16β - methyl - 20 - oxo - pregna - 4,6 - dieno - [3,2-C]pyrazole which is recrystallized from ethyl acetate:methanol.

By the above procedure other 11β,21-dihydroxypregn-4-eno[3,2-C]pyrazole may be produced from the corresponding 11-keto-21-acyloxy steroids. For example, 6,9α-dichloro-16α,17α-dichloromethylene-16β-methyl-11β,21-dihydroxy-20-oxo-2'-(4-fluorophenyl)pregna-4,6-dieno[3,2-C]pyrazole;

11β,21-dihydroxy-16α,17α-difluoromethylene-20-oxo-2'-(4-fluorophenyl)pregn-4-eno[3,2-C]pyrazole;

11β,21-dihydroxy-16α,17α-difluoromethylene-16β-methyl-20-oxo-2'-(4-fluorophenyl)pregn-4-eno[3,2-C]pyrazole;

9α-fluoro-11β,21-dihydroxy-16α,17α-difluoromethylene-20-oxo-2'-(4-fluorophenyl)pregn-4-eno[3,2-C]pyrazole;

9α-fluoro-11β,21-dihydroxy-16α,17α-difluoromethylene-16β-methyl-20-oxo-2'-(4-fluorophenyl)pregn-4-eno-[3,2-C]pyrazole;

9α-fluoro-11β,21-dihydroxy-16α,17α-difluoromethylene-20-oxo-2'-(4-fluorophenyl)pregna-4,6-dieno[3,2-C]pyrazole;

9α-fluoro-11β,21-dihydroxy-16α,17α-difluoromethylene-16β-methyl-20-oxo-2'-(4-fluorophenyl)pregna-4,6-dieno[3,2-C]pyrazole;

6α-methyl-11β,21-dihydroxy-16α,17α-difluoromethylene-20-oxo-2'-(4-fluorophenyl)pregn-4-eno[3,2-C]pyrazole;

6α-methyl-11β,21-dihydroxy-16α,17α-difluoromethylene-16β-methyl-20-oxo-2'-(4-fluorophenyl)pregn-4-eno-[3,2-C]pyrazole;

6-methyl-11β,21-dihydroxy-16α,17α-difluoromethylene-20-oxo-2'-(4-fluorophenyl)pregna-4,6-dieno[3,2-C]pyrazole;

6-methyl-11β,21-dihydroxy-16α,17α-difluoromethylene-16β-methyl-20-oxo-2'-(4-fluorophenyl)pregna-4,6-dieno[3,2-C]pyrazole;

6α-methyl-9α-fluoro-11β,21-dihydroxy-16α,17α-difluoromethylene-20-oxo-2'-(4-fluorophenyl)pregn-4-eno-[3,2-C]pyrazole;

6α,16β-dimethyl-9α-fluoro-11β,21-dihydroxy-16α,17α-difluoromethylene-20-oxo-2'-(4-fluorophenyl)pregn-4-eno[3,2-C]pyrazole;

6-methyl-9α-fluoro-11β,21-dihydroxy-16α,17α-difluoromethylene-20-oxo-2'-(4-fluorophenyl)pregna-4,6-dieno[3,2-C]pyrazole;

6,16β-dimethyl-9α-fluoro-11β,21-dihydroxy-16α,17α-difluoromethylene-20-oxo-2'-(4-fluorophenyl)pregna-4,6-dieno[3,2-C]pyrazole;

9α-chloro-11β,21-dihydroxy-16α,17α-dichloromethylene-20-oxo-2'-(4-fluorophenyl)pregn-4-eno[3,2-C]pyrazole;
6-fluoro-11β,21-dihydroxy-16α,17α-difluoromethylene-20-oxo-2'-(4-fluorophenyl)pregna-4,6-dieno[,3,2-C]pyrazole;
6-fluoro-11β,21-dihydroxy-16α,17α-difluoromethylene-16β-methyl-20-oxo-2'-(4-fluorophenyl)pregna-4,6-dieno[3,2-C]pyrazole;
6,9α-difluoro-11β,21-dihydroxy-16α,17α-difluoromethylene-20-oxo-2'-(4-fluorophenyl)pregna-4,6-dieno[3,2-C]pyrazole;
6,9α-difluoro-11β,21-dihydroxy-16α,17α-difluoromethylene-16β-methyl-20-oxo-2'-(4-fluorophenyl)pregna-4,6-dieno[3,2-C]pyrazole;
6-methyl-9α-chloro-11β,21-dihydroxy-16α,17α-dichloromethylene-20-oxo-2'-(4-fluorophenyl)pregna-4,6-dieno[3,2-C]pyrazole;
6-chloro-11β,21-dihydroxy-20-oxo-16α,17α-dichloromethylene-16β-methyl-2'-(4-fluorophenyl)prena-4,6-dieno[3,2-C]pyrazole;
6α-methyl-9α-chloro-11β,21-dihydroxy-16α,17α-difluoromethylene-20-oxo-2'-(4-fluorophenyl)pregn-4-eno[3,2-C]pyrazole;
20-oxo-16α,17α-difluoromethylene-16β-methyl-11β,21-dihydroxy-2'-(4-fluorophenyl)pregn-4-eno[3,2-C]pyrazole;
6,9α-dichloro-16α,17α-dichloromethylene-20-oxo-11β,21-dihydroxy-2'-(4-fluorophenyl)pregna-4,6-dieno[3,2-C]pyrazole are prepared from the corresponding 3-keto-Δ⁴-steroids in the manner of the above procedures.

Example X

To a stirred solution of 3 g. of 16α,17α-dichloromethylene-21-fluoropregn-4-ene-3,11,20-trione in 60 ml. of anhydrous benzene is added, with cooling and under nitrogen, a suspension of 3 ml. of ethyl formate and 1.3 g. of sodium hydride in mineral oil. The mixture is stirred at room temperature for 24 hours and hexane is then added until complete precipitation occurs. The solid which forms is collected, dried, suspended in aqueous hydrochloric acid, stirred at 25° C. for 1 hour and filtered. The solid is washed with water and dried to yield 2-hydroxymethylene-16α,17α-difluoromethylene-21-fluoropregn-4-ene-3,11,20-trione which is recrystallized from methylene chloride:hexane.

The steroid is added to a suspension of 0.5 g. of sodium acetate in 75 ml. of ethanol, and 0.88 g. of phenylhydrazine hydrochloride is added to this mixture. The mixture is refluxed for 2 hours and evaporated to dryness. The residue is taken up in chloroform, washed with a dilute acid solution, and with water to neutrality, dried and evaporated to dryness to yield 16α,17α-difluoromethylene-11,20-dioxo-21-fluoro-2'-phenylpregn-4-eno[3,2-C]pyrazole.

The steroid is added to a solution of 50 ml. of benzene, 5 ml. of ethylene glycol and 25 mg. of p-toluenesulfonic acid. The mixture is refluxed for 16 hours, cooled, washed with a weakly basic solution and with water, dried, evaporated, and placed in 200 ml. of methanol, cooled to 0° C. One gram of sodium borohydride in 3 ml. of water is added, and the mixture is allowed to stand for 18 hours at 25° C. Acetic acid is added and the mixture is concentrated to a small volume, diluted with water, extracted with ethyl acetate, washed with water, dried, evaporated, and acid hydrolyzed to 16α,17α-difluoromethylene-11β-hydroxy-20-oxo-21-fluoro-2'-phenylpregn-4-eno[3,2-C]pyrazole, which may be further purified by recrystallization from acetone:hexane.

Methyl, p-chlorophenyl, or p-fluorophenyl hydrazine can also be employed as reagents in the above procedure in place of phenylhydrazine.
Similarly 6,9α-dichloro-16α,17α-dichloromethylene-16β-methyl-11,20-dioxo-21-fluoro-2'-(4-chlorophenyl)pregna-4,6-dieno[3,2-C]pyrazole;
11β,21-dihydroxy-16α,17α-difluoromethylene-20-oxo-2'-phenylpregn-4-eno[3,2-C]pyrazole;
11β,21-dihydroxy-16α,17α-difluoromethylene-16β-methyl-20-oxo-2'-phenylpregn-4-eno[3,2-C]pyrazole;
9α-fluoro-11β,21-dihydroxy-16α,17α-difluoromethylene-20-oxo-2'-phenylpregn-4-eno[3,2-C]pyrazole;
9α-fluoro-11β,21-dihydroxy-16α,17α-difluoromethylene-16β-methyl-20-oxo-2'-phenylpregn-4-eno[3,2-C]pyrazole;
9α-fluoro-11β,21-dihydroxy-16α,17α-difluoromethylene-20-oxo-2'-phenylpregna-4,6-dieno[3,2-C]pyrazole;
9α-fluoro-11β,21-dihydroxy-16α,17α-difluoromethylene-16β-methyl-20-oxo-2'-phenylpregna-4,6-dieno[3,2-C]pyrazole;
6α-methyl-11β,21-dihydroxy-16α,17α-difluoromethylene-20-oxo-2'-phenylpregn-4-eno[3,2-C]pyrazole;
6α-methyl-11β,21-dihydroxy-16α,17α-difluoromethylene-16β-methyl-20-oxo-2'-phenylpregn-4-eno[3,2-C]pyrazole;
6-methyl-11β,21-dihydroxy-16α,17α-difluoromethylene-20-oxo-2'-phenylpregna-4,6-dieno[3,2-C]pyrazole;
6-methyl-11β,21-dihydroxy-16α,17α-difluoromethylene-16β-methyl-20-oxo-2'-phenylpregna-4,6-dieno[3,2-C]pyrazole;
6α-methyl-9α-fluoro-11β,21-dihydroxy-16α,17α-difluoromethylene-20-oxo-2'-phenylpregn-4-eno[3,2-C]pyrazole;
6α,16β-dimethyl-9α-fluoro-11β,21-dihydroxy-16α,17α-difluoromethylene-20-oxo-2'-phenylpregn-4-eno[3,2-C]pyrazole;
6-methyl-9α-fluoro-11β,21-dihydroxy-16α,17α-difluoromethylene-20-oxo-2'-phenylpregna-4,6-dieno[3,2-C]pyrazole;
6,16β-dimethyl-9α-fluoro-11β,21-dihydroxy-16α,17α-difluoromethylene-20-oxo-2'-phenylpregna-4,6-dieno[3,2-C]pyrazole;
9α,11β-dichloro-21-hydroxy-16α,17α-dichloromethylene-20-oxo-2'-phenylpregn-4-eno[3,2-C]pyrazole;
6-fluoro-11β,21-dihydroxy-16α,17α-difluoromethylene-20-oxo-2'-phenylpregna-4,6-dieno[3,2-C]pyrazole;
6-fluoro-11β,21-dihydroxy-16α,17α-difluoromethylene-16β-methyl-20-oxo-2'-phenylpregna-4,6-dieno[3,2-C]pyrazole;
6,9α-difluoro-11β,21-dihydroxy-16α,17α-difluoromethylene-20-oxo-2'-phenylpregna-4,6-dieno[3,2-C]pyrazole;
6,9α-difluoro-11β,21-dihydroxy-16α,17α-difluoromethylene-16β-methyl-20-oxo-2'-phenylpregna-4,6-dieno[3,2-C]pyrazole;
6-methyl-9α-chloro-11β-hydroxy-16α,17α-dichloromethylene-20-oxo-21-caproxy-2'-phenylpregna-4,6-dieno[3,2-C]pyrazole;
6-chloro-11,20-dioxo-16α,17α-dichloromethylene-16β-methyl-21-(tetrahydrofuran-2-yloxy)-2'-phenylpregna-4,6-dieno[3,2-C]pyrazole;
6α-methyl-9α-chloro-11β,21-dihydroxy-16α,17α-difluoromethylene-20-oxo-2'-phenylpregn-4-eno[3,2-C]pyrazole;
11,20-dioxo-16α,17α-difluoromethylene-16β-methyl-21-hydroxy-2'-phenylpregn-4-eno[3,2-C]pyrazole;
6,9α,11β-trichloro-16α,17α-dichloromethylene-20-oxo-21-adamantoyloxy-2'-phenylpregna-4,6-dieno[3,2-C]pyrazole are prepared from the corresponding 3-keto-Δ⁴-steroids in the manner of the above procedures.

Example XI

A culture of *Cunninghamella bainieri* ATCC 9244 is prepared by inoculating an aqueous medium containing 2% peptone and 5% corn syrup with a vegetating growth of the above culture in the same medium and stirring with aeration for 24 hours at 28° C.

To 340 ml. of this culture are then added 10 ml. of 1% ethanolic solution of 6α-methyl-16α,17α-difluoromethylene - 21 - hydroxypregn-4-ene-3,20-dione (prepared according to procedures in application Ser. No. 486,226). The mixture is stirred with aeration for 24 hours at 28° C., and then extracted several times with methylene chloride. These extracts are washed with water, dried over sodium sulfate, filtered and concentrated to a small volume under reduced pressure. The concentrated extracts are absorbed on a column of 20 g. of silica gel and 20 g. of Celite diatomaceous earth, previously washed with methylene chloride. Elution with 4:1 methylene chloride:acetone and crystallization yields 6α-methyl-11β, 21-dihydroxy-16α,17α-difluoromethylenepregn-4 - ene - 3, 20-dione.

In a similar manner, 6α-fluoro-11β-21-dihydroxy-16α, 17α - dichloromethylenepregna - 4,6 - diene - 3,20 - dione is prepared from 6α-fluoro-16α,17α-dichloromethylene-21-hydroxypregna-4,6-diene-3,20-dione.

By the procedures described in the previous examples, 6α - methyl - 11β,21 - dihydroxy - 16α,17α - difluoromethylene - 20 - oxo - 2' - (4 - fluorophenyl)pregn - 4-eno[3,2-C]pyrazole is prepared from 6α-methyl-11β,21-dihydroxy - 16α,17α - difluoromethylenepregn - 4 - ene-3,20-dione.

What is claimed is:

1. Compounds of the formula:

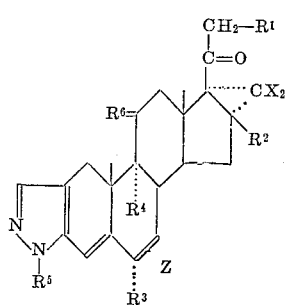

wherein:
X is fluoro or chloro;
Z is a carbon-carbon single bond or a carbon-carbon double bond.
$R^1$ is hydrogen, hydroxy, fluoro, hydrocarbon carboxylic acyloxy, tetrahydrofuran-2-yloxy and tetrahydropyran-2-yloxy;
$R^2$ is hydrogen or methyl;
$R^3$ is hydrogen, methyl, fluoro or chloro; $R^3$ being hydrogen or methyl when Z is a carbon-carbon single bond;
$R^4$ is hydrogen, fluoro or chloro;
$R^5$ is hydrogen methyl phenyl p-fluorophenyl; or p-chlorophenyl; and
$R^6$ is oxygen or the group

where $R^7$ is hydrogen, hydroxy or chloro, $R^4$ being chloro when $R^7$ is chloro;

2. Compounds according to claim 1 wherein
$R^1$ is hydroxy, fluoro or acetoxy;
$R^4$ is hydrogen or fluoro; and
$R^7$ is hydroxy or chloro.

3. Compounds according to claim 2 wherein X is fluoro.

4. Compounds according to claim 3 wherein $R^2$ is hydrogen.

5. Compounds according to claim 4 wherein
$R^1$ is hydroxy or acetoxy;
$R^5$ is phenyl or p-fluorophenyl; and
$R^7$ is hydroxy.

6. A compound according to claim 5 wherein
$R^3$ and $R^4$ are hydrogen; and
Z is a carbon-carbon single bond.

7. A compound according to claim 5 wherein
$R^3$ is hydrogen;
$R^4$ is fluoro; and
Z is a carbon-carbon single bond.

8. A compound according to claim 5 wherein
$R^3$ is methyl;
$R^4$ is hydrogen; and
Z is a carbon-carbon single bond.

9. A compound according to claim 5 wherein
$R^3$ is methyl;
$R^4$ is hydrogen; and
Z is a carbon-carbon double bond.

10. A compound according to claim 5 wherein
$R^3$ is methyl;
$R^4$ is fluoro; and
Z is a carbon-carbon single bond.

11. A compound according to claim 5 wherein
$R^3$ is methyl;
$R^4$ is fluoro; and
Z is a carbon-carbon double bond.

12. A compound according to claim 5 wherein
$R^3$ is fluoro;
$R^4$ is hydrogen; and
Z is a carbon-carbon double bond.

13. A compound according to claim 5 wherein
$R^3$ and $R^4$ are fluoro; and
Z is a carbon-carbon double bond.

References Cited
UNITED STATES PATENTS 3,299,054   1/1967   Tishler et al. _____ 260—239.5

ELBERT L. ROBERTS, *Primary Examiner.*
H. FRENCH, *Assistant Examiner.*